Patented Sept. 21, 1943

2,329,783

UNITED STATES PATENT OFFICE 2,329,783

WATER - SOLUBLE DYESTUFFS OF THE ANTHAQUINONE SERIES AND A PROCESS FOR THEIR MANUFACTURE

Albin Peter, Basel, Switzerland, assignor to the firm Sandoz A. G., Basel, Switzerland No Drawing. Application December 8, 1939, Serial No. 308,289. In Switzerland December 19, 1938

9 Claims. (Cl. 260—373)

The present invention relates to the manufacture of new water-soluble dyestuffs of the anthraquinone series which are useful for dyeing animal fibres and cellulose esters and to a process for their manufacture.

It has been found that by treating such unsulphonated anthraquinone compounds that contain in the molecule at least one primary amino group which can be contained in the anthraquinone or in the arylamino radical, with formaldehyde and a phenol, and subsequently sulphonating the intermediate products thus obtained new and valuable water-soluble anthraquinone dyestuffs will be obtained.

In order to carry out the present invention I use as starting products anthraquinone compounds possessing at least one primary amino group such as 1-aminoanthraquinone and its derivatives which do not contain the halogen in the same nucleus as the amino group, 1-amino-4-hydroxy- and -alkoxyanthraquinone, 1,4-diaminoanthraquinone, 1,4-diamino-2-bromo-, -2-methyl-, and -2-alkoxyanthraquinone, 1-amino-4-methylamino- and hexahydroanilidoanthraquinone; aminoarylaminoanthraquinones, such as 1-amino-4-anilidoanthraquinone, 1-amino-4-meta- and -p-toluidoanthraquinone, -4-paraxylidinoanthraquinone, -4-metachloroanilidoanthraquinone, -4-paraphenylenediaminoanthraquinone, 1-amino-5- and -8-anilidoanthraquinone, further polyamines such as 1,4,5,8-tetraaminoanthraquinone, 1-hydroxy-4,5,8-triaminoanthraquinone and the like. These compounds contain the amino group linked to the anthraquinone radical.

But also compunds that contain the amino group in the arylamino radical can be used; such compounds are f. i. 1-methylamino-, 1-ethylamino-, 1-n- and -i-propylamino-, 1-hydroxyethylaminoanthraquinone and the like, which contain in the 4-position the radical of paraphenylenediamine.

As phenols I may use phenol and substituted phenols such as p-chlorophenol, o-meta- and -paracresol, guaïacol, dichlorophenols, xylenols and the like.

In order to carry out the condensation operation all three components; the aminoanthraquinone, the phenol and the formaldehyde are thoroughly mixed together during an appropriate time at room temperature. But sometimes it is preferable to carry out the condensation at an elevated temperature up to 100° C. The ingredients can be mixed together in any desirable manner; f. i. all three components can be mixed at once together or one can proceed as follows: the anthraquinone compound is first dissolved in phenol and then formaldehyde added thereto, or the anthraquinone compound is first mixed with forsmaldehyde or paraformaldehyde and introduced into phenol, or phenol and formaldehyde are first mixed together and the anthraquinone compound introduced into this mixture.

The condensation is finished when a test taken out will be easily sulphonated without residue by means of sulphuric acid monohydrate. The phenol, which also operates as solvent in the course of the condensation can be partially replaced by another indifferent organic solvent such as benzene, toluene, ethanol and the like.

After the condensation is achieved the solvent is separated from the condensation product by distilling it off in vacuo or with steam or by stirring the reaction mixture in a strong alkali solution or salt solution, whereby the condensation product is precipitated and can be filtered off.

The sulphonation of the condensation products is carried out with sulphuric acid or fuming sulphuric acid of appropriate concentration until a test indicates that the condensation product has become completely soluble in a dilute aqueous sodium carbonate solution. The dyestuffs thus obtained are then isolated in any usual manner and dried in vacuo, preferably below 100° C.

The new compounds prepared in this manner possess probably in the case where the amino group is situated in the anthraquinone radical the following formula

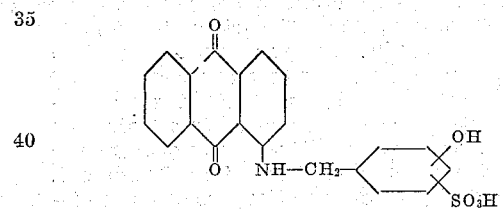

while in the case the amino group was contained in the aryl-amino radical they will possess the formula

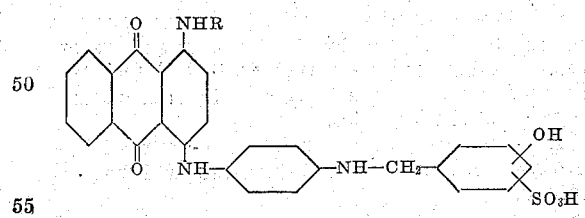

In both these formulae the anthraquinone and the aryl radical may contain other substituents.

The dyestuffs thus obtained dye wool, silk and cellulose ester fibres of strong shades possessing valuable properties.

The dyeings on acetate rayon possess nearly the same shade as those produced with suspensions of the original aminoanthraquinones. It is, therefore, probable that the water-soluble compounds become decomposed during the dyeing process under regeneration of the original aminoanthraquinone.

The following examples, without being limitative and the parts being by weight, illustrate the invention.

Example 1

20 parts of 1-aminoanthraquinone are mixed at 100° C. with 100 parts of phenol. At this temperature 20 parts of formaldehyde of 40% by volume are introduced into the mixture and the mixture is stirred for 2 hours. The melt thus obtained is then poured into 1000 parts of water containing 50 parts of sodium chloride and 45 parts of sodium hydroxide. The condensation product which is precipitated is filtered, suspended in water and neutralized with sulpuric acid. When filtered, washed and dried a brown-red powder soluble in ethanol with a scarlet-red coloration is obtained.

10 parts of the dyestuff base obtained as above described are dissolved in 30 parts of sulphuric acid monohydrate at a temperature below 20° C. and stirred until a test shows that the product has become clearly soluble in dilute sodium carbonate solution. The reaction product is then poured into 500 parts of a 5% aqueous sodium chloride solution, the precipitated dyestuff filtered and washed with a 5% sodium chloride solution until it becomes nearly acid free. The filter cake is then mixed with soda until the product becomes neutral and thereupon dried. The dyestuff thus obtained is soluble in water with a red coloration and dyes acetate silk from a neutral bath orange shades.

Similar dyestuffs are obtained if 1-amino-5-chloro or -8-chloroanthraquinones are used.

Example 2

200 parts of phenol are melted and mixed with 25 parts of formaldehyde of 40 per cent by volume. To this mixture and under good stirring there are added at 40° C. 40 parts of 1-amino-4-methoxyanthraquinone. The mixture is then stirred during 4 hours at this temperature and introduced into a solution of 100 parts of sodium chloride and 90 parts of sodium hydroxide in 2000 parts of water. The working up of the base is carried out as described in Example 1.

10 parts of the condensation product are dissolved at 20° C. in 30 parts of sulphuric acid monohydrate and stirred for half an hour. A test shows then that the product has become clearly soluble in dilute sodium carbonate solution. The dyestuff is isolated in the manner described in Example 1 by stirring it in salt water, etc. It dissolves in water with a bluish-red coloration and dyes acetate silk from a neutral bath a beautiful scarlet.

By using as starting product 1-amino-4-hydroxy-anthraquinone, a bluish-red will be obtained.

Example 3

100 parts of phenol are mixed with 15 parts of formaldehyde of 40% by volume and 20 parts of 1,4-diaminoanthraquinone are introduced thereinto at 40° C. and the mixture is stirred for 4 hours. The condensation product thus obtained is isolated as above described. On sulphonation with sulphuric acid-monohydrate at 20° C. a dyestuff will be obtained which dissolves in water with a violet coloration and dyes acetate silk reddish-violet shades.

The dyestuff obtained from 1,4-diamino-2-methylanthraquinone gives a similar violet; that from 1,4-diamino-2-bromoanthraquinone gives a blue-violet and that from 1,4-diamino-2-methoxyanthraquinone a bluish-red.

Example 4

100 parts of p-chlorophenol are melted at 40° C. with 10 parts of 1,4-diamino-2-methylanthraquinone and 6 parts of formaldehyde of 40% by volume are added thereto under good stirring. The mixture is then stirred at this temperature for 2 hours and the condensation product is isolated by diluting the reaction mass with alkaline salt water. On sulphonation of the base with the sulphuric acid monohydrate at 20° C., a dyestuff will be obtained which dyes acetate silk from aqueous solution violet shades.

Instead of p-chlorophenol one can also use with the same result guaïacol or o-, m- or p-cresol.

Example 5

20 parts of 1-amino-4-methylaminoanthraquinone are mixed with 3 parts of paraformaldehyde and introduced into 100 parts of melted phenol. The mixture is stirred for 2 hours at 45° C. and introduced into 1000 parts of a 5% sodium chloride solution containing 80 parts of technical caustic soda lye. The precipitated base is then separated as above described.

The sulphonation of the base is carried out as described in Example 1. The dyestuff thus obtained dissolves in water with a blue coloration and dyes acetate silk blue-violet shades. A similar shade will be obtained with the dyestuff prepared from 1-amino-4-cyclohexylaminoanthraquinone.

Example 6

20 parts of 1-amino-4-phenylaminoanthraquinone and 100 parts of phenol are heated until a complete solution is obtained. The same is then cooled down to 40° C. 10 parts of a formaldehyde solution of 40% by volume are then slowly added thereto and the mixture is stirred for 2 hours. The condensation product thus obtained is isolated and sulphonated as above described. It dissolves in water with a blue coloration and dyes acetate silk from a neutral bath preferably in the presence of a wetting and dispersing agent reddish-blue shades.

Similar shades will be obtained with dyestuffs prepared from 1-amino-4-(3'- or -4'-methyl)-phenylaminoanthraquinone, 1-amino-4-(2',5'-dimethyl-phenylaminoanthraquinone or 1 amino - 4-(3'-chloro)-phenylaminoanthraquinone.

Example 7

20 parts of 1-amino-4-(4'-amino)-phenylaminoanthraquinone are dissolved at 100° C. in 100 parts of phenol and 20 parts of formaldehyde of 40% by volume are added thereto. After the condensation is achieved the reaction mass is stirred in alkaline salt water and the base isolated and sulphonated in the manner described above. A dyestuff dissolving in water with a blue-green coloration and dyeing acetate silk from a neutral bath blue shades will be obtained.

*Example 8*

20 parts of 1-amino-5-phenylaminoanthraquinone are introduced at 40° C. into a mixture consisting of 100 parts of phenol and of 7 parts of formaldehyde of 40% by volume. After stirring for 1 hours at this temperature, the product is isolated by pouring into alkaline salt water. On sulphonation with sulphuric acid monohydrate at 20° C. a water-soluble dyestuff dyeing acetate silk intense red shades will be obtained.

The dyestuff obtained from 1-amino-8-phenyl-aminoanthraquinone gives a bluish-red shade.

*Example 9*

20 parts of 1,4,5,8-tetraaminoanthraquinone are mixed at 100° C. with 100 parts of phenol and 25 parts of formaldehyde of 40% by volume are introduced thereinto within 1 hour and the mixture is stirred for a short period. The reaction mixture is then poured into alkaline salt water and the dyestuff isolated and sulphonated with sulphuric acid monohydrate as above described. The dyestuff thus obtained is soluble in water with a green-blue coloration and dyes acetate silk a pure blue shade.

*Example 10*

0.15 part of the dyestuff obtained according to Example 6 are dissolved in a small quantity of hot water and poured into 400 parts of a dye bath containing 0.8 part of soap or of another wetting or dispersing agent. At 40° C. 10 parts of acetate silk are introduced into the bath, the temperature is raised to 80° C. and the dyeing is effected for 1 hour at this temperature. The acetate silk thus dyed shows a deep blue shade.

*Example 11*

20 parts of 1-methylamino-4-(4'-amino)-phenylaminoanthraquinone are dissolved at 80° C. in 100 parts of phenol and 10 parts of a formaldehyde solution of 40% by volume are slowly introduced thereinto and the mixture is stirred for a short time at this temperature. The reaction mixture is then poured into 1000 parts of water containing 50 parts of sodium chloride and 40 parts of sodium hydroxide. The precipitated base is filtered, washed with salt water of 5% and suspended in 1000 parts of water and acidulated with hydrochloric or sulphuric acid. The precipitated base is then filtered again, washed with water and dried at a low temperature.

10 parts of the base are dissolved at 20–25° C. in 50 parts of sulphuric acid monohydrate and stirred for half an hour. If after this time a test shows that the product is not clearly soluble in a dilute sodium carbonate solution, 10 parts of fuming sulphuric acid containing 27% of SO₃ are added to the reaction mixture. After the sulphonation is finished the reaction mass is introduced into 500 parts of water and the precipitated dyestuff filtered and washed with water. The filter cake is then mixed with such a quantity of sodium carbonate that it becomes slightly alkaline, and dried.

The dyestuff thus obtained dissolves in water with a blue-green and in concentrated sulphuric acid with a steel-blue coloration. It dyes acetate silk from aqueous solutions very fast blue-green shades.

*Example 12*

20 parts of 1-methylamino-4-(4'-amino)-phenylaminoanthraquinone are stirred for 8 hours at 40° C. with 100 parts of phenol and 10 parts of formaldehyde of 40% by volume and the base is isolated and sulphonated as described in the previous example. The same dyestuff as in Example 11 will be obtained.

*Example 13*

100 parts of phenol are melted at 40° C. and mixed with 10 parts of a formaldehyde solution of 40% by volume, 20 parts of 1-methylamino-4-(4'-amino)-phenylaminoanthraquinone are introduced thereinto under good stirring and the whole is stirred for 8 hours at this temperature. The dyestuff base isolated and sulphonated as above described gives the same dyestuff as those of Examples 11 and 12.

*Example 14*

20 parts of 1-methylamino-4-(4'-amino)-phenylaminoanthraquinone are dissolved at 100° C. in 100 parts of o-cresol, the solution is cooled down to 20° C. and 10 parts of a formaldehyde solution of 40% by volume are added thereto. After stirring for several hours, the reaction mixture is introduced into 1000 parts of water containing 50 parts of sodium chloride and 40 parts of sodium hydroxide and the base is isolated. The base thus obtained is sulphonated as described in Example 11, whereby a dyestuff soluble in water with a bluish-green and in concentrated sulphuric acid with a violet steel-bluish coloration is obtained. It dyes acetate silk and Cotopa yarn or acetyl cellulose films very fast blue-green shades.

Similar dyestuffs will be obtained if the o-cresol used in this example is replaced by the technical mixture of meta- and paracresol, or guaïacol, parachloro-phenol, 2,-4-xylenol, or 3,4-dichlorophenol.

*Example 15*

A mixture of 2.6 parts of trihydroxymethylene and 20 parts of 1-ethylamino-4-(4'-amino)-anthraquinone are introduced at 45° C. into 100 parts of melted phenol and stirred at this temperature, until the condensation is achieved. The reaction mass is then worked up and sulphonated as above described, whereby a dyestuff is obtained which dissolves in concentrated sulphuric acid with a grey and in hot water with a greenish-blue coloration and which dyes acetate silk intense blue-green shades.

Similar dyestuffs are obtained when 1-n- or -i-propyamino-4-(4'-amino-)phenylaminoanthraquinone or 1-β-hydroxyethylamino-4-(4'-amino)-phenylamino-anthraquinone are used as starting materials.

What I claim is:

1. The water-soluble anthraquone dyestuffs containing in their molecule one anthraquinone radical and at least one group of the general formula

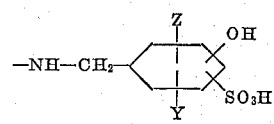

wherein Y and Z stand each for one member of the group consisting of hydrogen, halogen, alkyl and alkoxy, said dyestuffs being easily soluble in water and dyeing animal fibres and cellulose esters.

2. A process for the production of water-soluble anthraquinone dyestuffs, comprising the steps of treating a water-insoluble unsulphonated compound containing one anthraquinone radical and at least one primary amino group with a phenol of the benzene series and formaldehyde and sulphonating the condensation product thus obtained.

3. A process for the production of water-soluble anthraquinone dyestuffs, comprising the steps of treating a water-insoluble unsulphonated compound containing one anthraquinone radical and at least one primary amino group with phenol and formaldehyde and sulphonating the condensation product thus obtained.

4. A process for the production of a water-soluble anthraquinone dyestuff, comprising the steps of treating 1,4-diaminoanthraquine with phenol and formaldehyde and sulphonating the condensation product thus obtained with sulphuric acid.

5. A process for the production of a water-soluble anthraquinone dyestuff, comprising the steps of treating 1-methylamino-4-aminoanthraquinone with phenol and formaldehyde and sulphonating the condensation product thus obtained with sulphuric acid.

6. A process for the production of a water-soluble anthraquinone dyestuff, comprising the steps of treating 1-methylamino-4-(4'-amino)-phenylaminoanthraquinone with phenol and formaldehyde and sulphonating the condensation product thus obtained with sulphuric acid.

7. The water-soluble anthraquine dyestuff of the formula

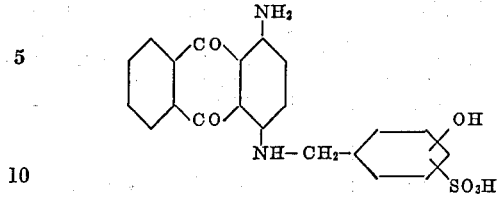

which is soluble in water with violet coloration and dyes acetate silk reddish-violet shades.

8. The water-soluble anthraquinone dyestuff of the formula

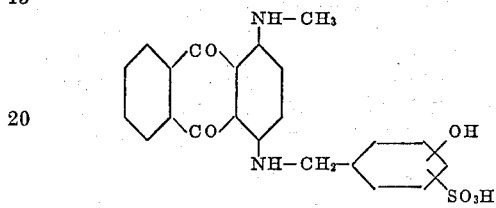

which is soluble in water with a blue coloration and dyes acetate silk blue-violet shades.

9. The water-soluble anthraquinone dyestuff of the formula

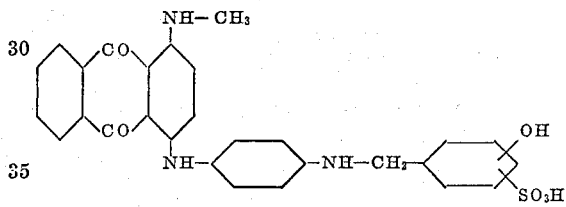

which is soluble in water with a blue-green coloration and dyes acetate silk fast blue-green shades.

ALBIN PETER.